Aug. 23, 1932.     F. F. KUHL     1,873,650
AUTOMATIC DOORCHECK OR CLOSER
Filed July 28, 1931     3 Sheets-Sheet 1

Ferdinand F. Kuhl
INVENTOR

BY Victor J. Evans
and Co. ATTORNEYS

Aug. 23, 1932.  F. F. KUHL  1,873,650
AUTOMATIC DOORCHECK OR CLOSER
Filed July 28, 1931  3 Sheets-Sheet 2

Ferdinand F. Kuhl
INVENTOR

BY Victor J. Evans
and Co.  ATTORNEYS

Aug. 23, 1932.  F. F. KUHL  1,873,650

AUTOMATIC DOORCHECK OR CLOSER

Filed July 28, 1931   3 Sheets-Sheet 3

Ferdinand F. Kuhl
INVENTOR

BY Victor J. Evans
and Co.  ATTORNEYS

Patented Aug. 23, 1932

1,873,650

UNITED STATES PATENT OFFICE

FERDINAND F. KUHL, OF BEATRICE, NEBRASKA

AUTOMATIC DOORCHECK OR CLOSER

Application filed July 28, 1931. Serial No. 553,640.

The invention relates to a door check and more especially to an automatic door check or closer.

The primary object of the invention is the provision of a device of this character wherein a door will be automatically closed under the action of a tensioned spring and the closing movement of such door will be uniform and without sudden jerks so as to relieve the slamming or pounding of the door when brought to closing position.

Another object of the invention is the provision of a device of this character wherein the door in the automatic closing thereof will be completely closed and the tension thereon will be governed during closing movement so that such door will not shut quickly nor slam nor pound in its closing action, the device being novel in form so that it may be used on a door swinging from left to right or from right to left in the opening and closing movements thereof.

A further object of the invention is the provision of a device of this character wherein in the assembly thereof the springs for the tensioning action can be set at a determined tension and on assembly may be manually adjusted to increase or decrease the tension accordingly to the requirements for the automatic closing of the door under the weight of the same.

A still further object of the invention is the provision of a device of this character wherein the movement of the door and the automatic closing thereof is under the control of a governor, thus avoiding the slamming or hammering of the door or the pounding thereof when reaching closed position.

A still further object of the invention is the provision of a device of this kind which is comparatively simple in construction, thoroughly reliable and efficient in its operation, positive in action, readily and easily adjusted with dispatch, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Similar reference characters indicate corresponding parts throughout the several views in the drawings.

Figure 3:
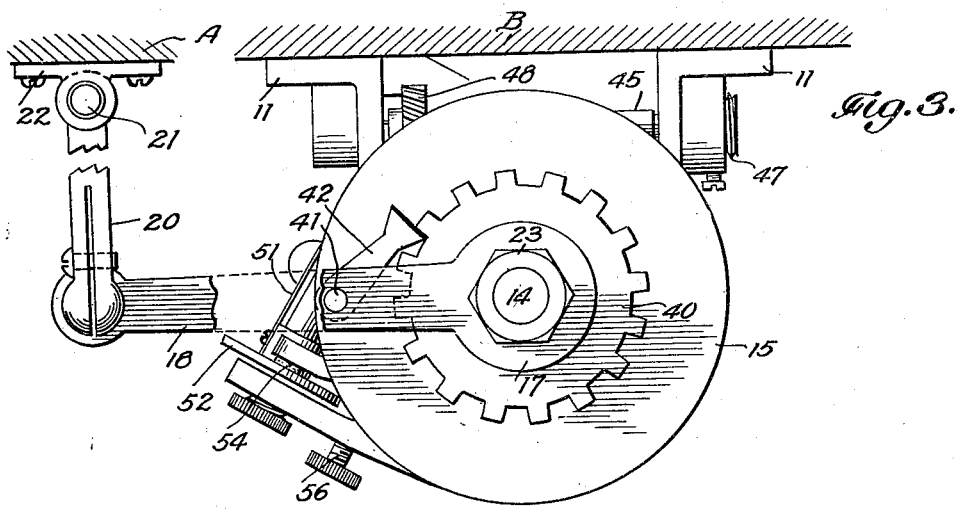
Figure 3 is a top plan view showing fragmentarily the application of the device both to the door and door frame, the door being in closed position.

Referring to the drawings in detail, A designates a portion of a door frame and B a portion of a door of the swinging type adapted to be swung from left to right as is disclosed in Figure 3 of the drawings and upon these is mounted the door check or closer which comprises a body or cylindrical casing or shell 10 preferably made from metal having at one side thereof laterally extending wings or flanges 11 for fastening in any desirable manner upon the door the said body, casing or shell and this has formed therein a chamber 12, while centrally of the body thereof is a stud bearing 13 in which is fitted an axle or spindle 14, this being vertically disposed and is free for rotation in said bearing. The axle or spindle 14 extends upwardly through a screw cover or cap 15 for the body, casing or shell 10 and is formed with a reduced upper portion 16 having opposed flattened faces to accommodate the coupling end 17 of a checking or closing arm 18 having arranged at its outer end a ball and socket pivotal connection 19 with a link 20 which is pivoted at 21 to a bracket 22 fixed to the door frame A. The coupling end 17 of the arm 18 is detachably made secure by a nut 23 engaging the threaded end 24 of the axle or spindle 14.

Figure 10:
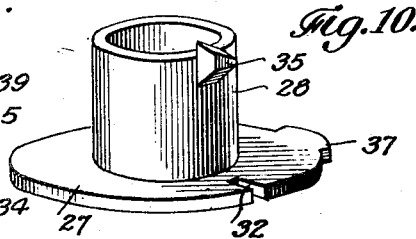
Figure 10 is a perspective view of the lower portion of the barrel.
Figure 14:
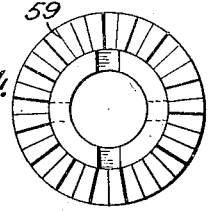
Figure 14 is a top plan view of the part shown in Figure 13.
Figure 6:
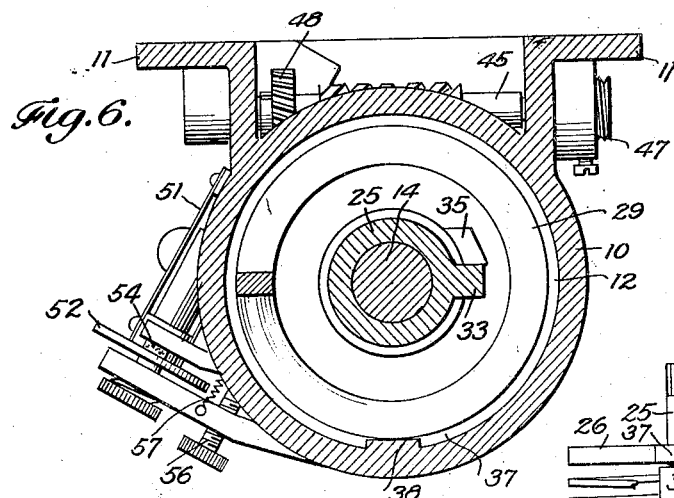
Figure 6 is a sectional view on the line 6—6 of Figure 4.
Figure 8:
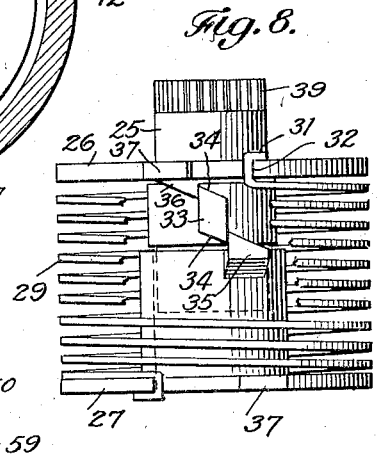
Figure 8 is an elevation of the spring barrel removed from the device and a part of the spring being broken away.
Figure 7:
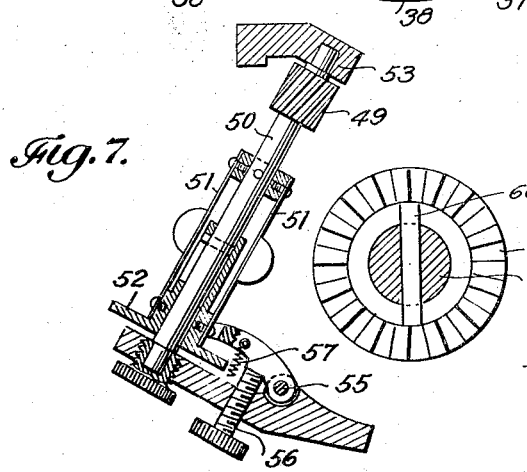
Figure 7 is a sectional view fragmentarily shown taken on the line 7—7 of Figure 4.

Arranged within the body, casing or shell 10 is a spring barrel including a hub 25 about the upper end portion of which is engaged a disk-like top plate 26, while telescoped on the lower end portion of the hub is the lower portion 27 of the barrel, this forming a disk-like bottom plate and a central sleeve 28 which telescopes over the lower end portion of said hub and also fits the bearing 13 of the body, casing or shell 10. Surrounding the hub 25 between the plates 26 and 27 is a coiled tensioning spring 29, the lower plate 27 and the upper hook end 31 engages in a notch 32 in the upper or top plate 26. The hub 25 carries an abutment lug 33 having the correspondingly beveled upper and lower faces 34, while formed on the sleeve 28 is a beveled lug 35 and likewise formed on the under face of the top plate 26 is a beveled lug 36, these lugs 35 and 36 being adapted for locking engagement with the lug 33 when the spring is twisted in one direction for the tensioning thereof so that it can be set at a determined tension prior to the assembly of the spring barrel and the spring within the body, casing or shell, the beveled faces on the said lugs 33, 35 and 36 permitting ratchet connection between the hub 25, top plate 26 and bottom plate 27 of the barrel as will be clearly obvious in Figures 6, 8 and 10 of the drawings. The plates 26 and 27 at their periphery are provided with abutments 37 each to engage a companion abutment 38 formed on the body, casing or shell interior thereof to hold the said plate against rotation within said body, casing or shell on the assembly of the barrel and the spring therein.

The hub 25 is loosely engaged upon the upper portion of the spindle 14 and projects through the screw cap or cover 15 with the uppermost end portion thereof toothed at 39 for the locking therewith of a ratchet ring 40, the latter lying below the coupling end 17 of the arm 18 and this arm has pivoted thereto at 41 a reversing dog or pawl 42 to cooperate with the ratchet ring 40. On manually turning the ring 40 the spring 29 can be further tensioned beyond the determined set condition thereof on its assembly within the body, casing or shell 10. The pawl or dog 42 can be reversed for action with the ring 40 when the device is mounted to check and automatically close a door swinging from right to left, this being obvious. The pawl or dog 42 locks the ring to maintain the tensioned condition of the spring 29 as will be obvious.

Loosely journaled on the bearing 13 beneath the bottom of the body, casing or shell 10 is a worm gear 43 meshing with a worm screw 44 on a short shaft 45 journaled at 46 in bearings 47 formed at the bottom portion of said body, casing or shell 10, the short shaft 45 being horizontally disposed at right angles to the vertical position of the spindle or axle 14 and to one side of the longitudinal axis thereof. This shaft 45 carries a gear 48 meshing with a pinion 49 on a governor shaft 50, the latter having fixed thereto the outwardly springing ball carrying governor arms 51 which operate a braking disk 52 slidably fitted upon the shaft 50 and splined or keyed thereto, the shaft 50 being mounted in bearings 53 and engageable with this braking disk is an adjustable brake shoe 54 pivoted at 55 and adjustable through a set screw 56, the shoe being tensioned by a spring 57.

Figure 1:
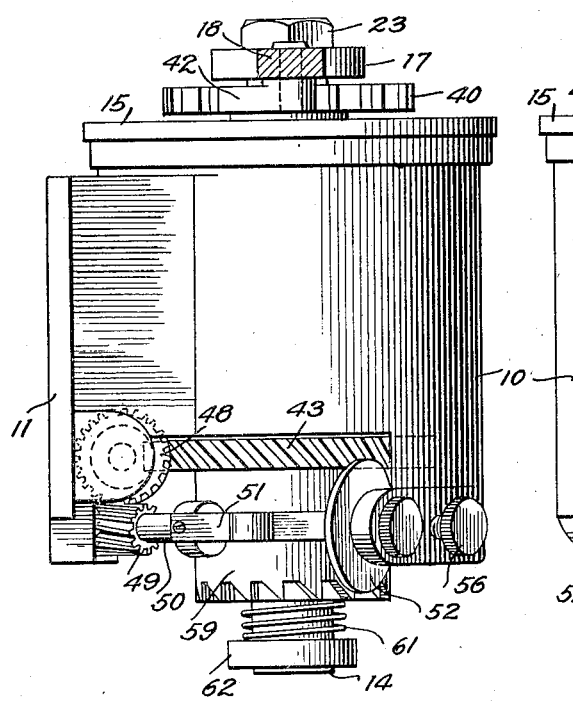
Figure 1 is an elevation of the device constructed in accordance with the invention looking toward one side thereof.
Figure 2:
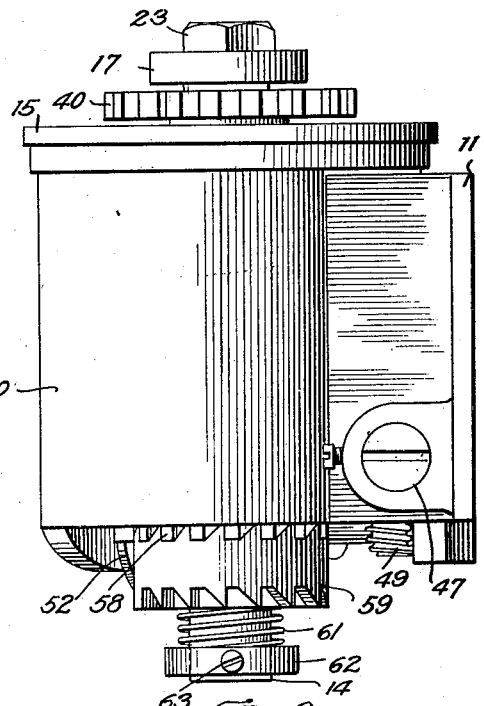
Figure 2 is a similar view looking toward the opposite side.
Figure 12:
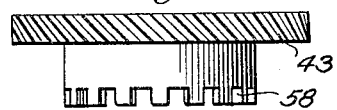
Figure 12 is a side elevation of one part of a ratchet used in the device.
Figure 9:
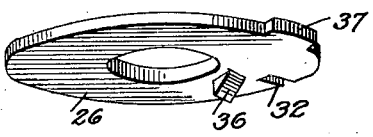
Figure 9 is a perspective view of the top plate of the barrel.
Figure 13:
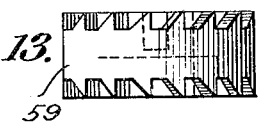
Figure 13 is a side elevation of the lower part of the ratchet and this being reversible.
Figure 11:
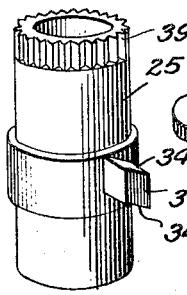
Figure 11 is a perspective view of the hub of the barrel.

The gear 43 is formed with a clutch part 58, the latter being engageable with a companion and reversible clutch part 59 carried by the axle or spindle 14 and keyed at 60 thereto for limited sliding movement, the part 59 being held in positive clutch engagement with the part 58 through the medium of a coiled spring 61 adjustably seated by a collar 62 having the binding screw 63 making it fast upon the lower end of the axle or spindle 14. The part 59 is reversible to permit the device to be used on a door mounted for swinging movement from right to left, this being a reversal of the mounting of the device as shown in Figure 1 of the drawings.

It will be apparent that the governor in its action automatically checks the spring tension so that when the spring 29 is active for the automatic closing of the door A, the latter will have a smooth and gradual closing action under the tension of the spring and the operation of the governor without any possibility of the slamming, pounding or hammering of the door when reaching closing position and yet it will completely close automatically in the operation of the device.

Figure 4:
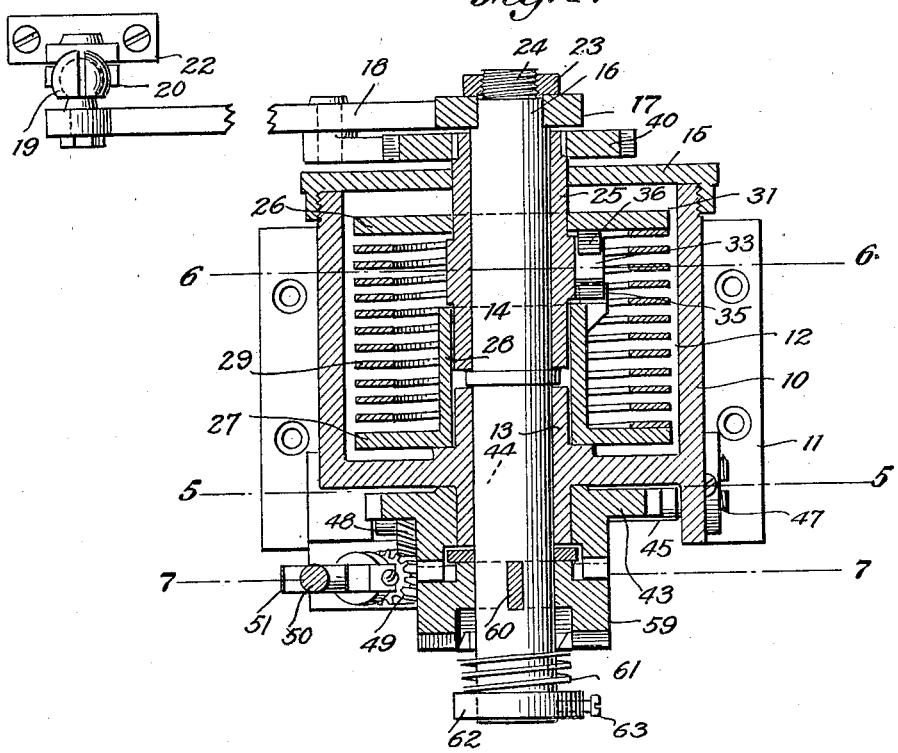
Figure 4 is a vertical longitudinal sectional view through the device in the position as shown in Figure 3.
Figure 5:
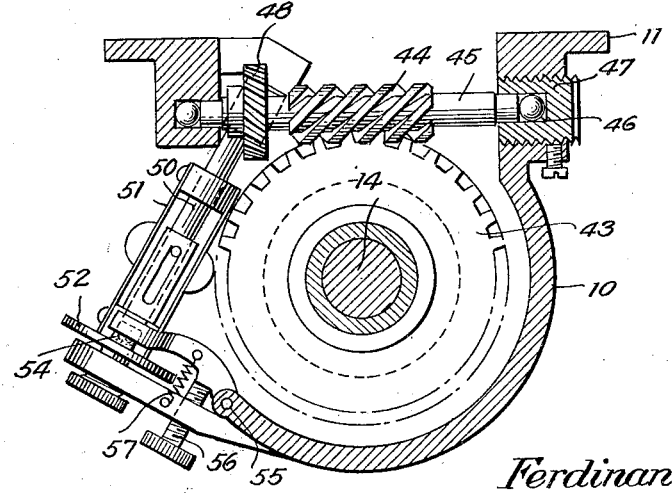
Figure 5 is a sectional view on the line 5—5 of Figure 4.

As has been heretofore stated when the spring 29 is to be assembled within the device it can be tensioned to a determined degree and set by the barrel therefor prior to the introduction of the latter and the spring into the device and should this determined setting of the tension of the spring be not sufficient to meet the requirements under the weight of a door to be automatically closed the ratchet ring 40 can be manually adjusted to increase the tension of the spring and this should be obvious. On the further tensioning of the spring 29 the dog or pawl 42 maintains and holds such tension in coaction with the ring 40 and this will be obvious from Figures 3 and 4 of the drawings.

What is claimed is:—

1. In a door closer, a cylindrical casing having a central stud bearing, a spindle fitted in said bearing, a closer arm fixed to the upper end of the spindle, a spring barrel about the spindle and having an upper hub, a sleeve portion in the barrel and telescoped upon the hub and bearing of the casing, a coiled tensioning spring surrounding the hub and sleeve, a notched bottom plate on the sleeve, a notched top plate on the hub, hook ends on the spring engaging the notched plates, an abutment lug on the hub, a beveled lug on the sleeve, a beveled lug on the top plate, said beveled lug being adapted for locking engagement with the abutment lug and forming a ratchet action therebetween, abutments formed on the plates, abutments formed in the casing and engaging the last named abutments, said hub being adapted to loosely receive the spindle, a ratchet ring fixed to the hub, a ratchet dog carried by the closer arm and engaging the ratchet ring, a worm gear journaled on the bearing, a worm screw journaled on the casing and meshing with the gear, a governor having connection with the worm screw, and a reversible ratchet clutch having one portion on the worm gear and the other portion on the spindle.

2. In a door closer, a cylindrical casing having a central stud bearing, a spindle fitted in said bearing, a closer arm fixed to the upper end of the spindle, a spring barrel about the spindle and having an upper hub, a sleeve portion in the barrel and telescoped upon the hub and bearing of the casing, a coiled tensioning spring surrounding the hub and sleeve, a notched bottom plate on the sleeve, a notched top plate on the hub, hook ends on the spring engaging the notched plates, an abutment lug on the hub, a beveled lug on the sleeve, a beveled lug on the top plate, said beveled lug being adapted for locking engagement with the abutment lug and forming a ratchet action therebetween, abutments formed on the plates, abutments formed in the casing and engaging the last named abutments, said hub being adapted to loosely receive the spindle, a ratchet ring fixed to the hub, a ratchet dog carried by the closer arm and engaging the ratchet ring, a worm gear journaled on the bearing, a worm screw journaled on the casing and meshing with the gear, a governor having connection with the worm screw, a reversible ratchet clutch having one portion on the worm gear and the other portion on the spindle, and means on the spindle for tensioning the portion of the clutch thereon in the direction of the portion on the worm gear.

In testimony whereof I affix my signature.

FERDINAND F. KUHL.